United States Patent [19]

Brown

[11] Patent Number: 5,729,483
[45] Date of Patent: Mar. 17, 1998

[54] IMPLEMENTATION OF A DIGITAL INTERPOLATION FILTER AND METHOD

[75] Inventor: Glen Brown, Austin, Tex.

[73] Assignee: Advanced Micro Devices, Sunnyvale, Calif.

[21] Appl. No.: 557,592

[22] Filed: Nov. 14, 1995

[51] Int. Cl.$^6$ .................................................. G06F 17/10
[52] U.S. Cl. ..................... 364/724.1; 364/724.16
[58] Field of Search ........................... 364/724.1, 724.16

[56] References Cited

U.S. PATENT DOCUMENTS

| | | | |
|---|---|---|---|
| 5,196,850 | 3/1993 | Duffy et al. | 341/76 |
| 5,212,659 | 5/1993 | Scott et al. | 364/724.1 |
| 5,245,344 | 9/1993 | Sooch | 341/150 |
| 5,298,900 | 3/1994 | Mauthe et al. | 341/143 |
| 5,323,157 | 6/1994 | Ledzius et al. | 341/143 |
| 5,376,936 | 12/1994 | Kerth et al. | 341/150 |
| 5,500,811 | 3/1996 | Corry | 364/724.16 |
| 5,541,864 | 7/1996 | Van Bavel et al. | 364/724.1 |
| 5,586,068 | 12/1996 | Rakib | 364/724.16 |
| 5,590,065 | 12/1996 | Lin | 364/724.16 |

OTHER PUBLICATIONS

"An Integrated Per–Channel PCM Encoder Based on Interpolation," Bruce A. Wooley, et al., *IEEE Transactions on Communications*, vol. COM–27, No. 2, Feb. 1979, pp. 272–277.

"Multirate Filter Designs Using Comb Filters," Shuni Chu, et al., *IEEE Transactions on Circuits and Systems*, vol. CAS–31, No. 11, Nov. 1984, pp. 913–924.

"An Economical Class of Digital Filters for Decimation and Interpolation," Eugene B. Hogenauer, *IEEE Transactions on Acoustics, Speech, and Signal Processing*, vol. ASSP–29, No. 2, Apr. 1981, pp. 155–162.

"Multirate Digital Filters, Filter Banks, Polyphase Networks, and Applications: A Tutorial," P.O. Vaidyanathan, *Proceedings of the IEEE*, vol. 78, No. 1, Jan. 1990, pp. 56–93.

"A Multistage Delta–Sigma Modulator without Double Integration Loop," Toshio Hayashi, et al., *1986 IEEE International Solid–State Circuits Conference*, ISSCC 86/Thursday, Feb. 20, 1986/California Pavilion C., THPM 14.6, pp. 182–183.

"A 3–$\mu$n CMOS Digital Codec with Programmable Echo Concellation and Gain Setting," Paul Defraeye, et al., *IEEE Journal of Solid–State Circuits*, vol. SC–20, No. 3, Jun. 1985, pp. 679–687.

"A 17–bit Oversampling D–to–A Conversion Technology Using Multistage Noise Shaping," Yasuyuki Matsuya, et al., *IEEE Journal of Solid–State Circuits*, vol. 24, No. 4, Aug. 1989, pp. 969–975.

"Fourth Order Sigma–Delta Modulator Circuit for Digital Audio and ISDN Applications," T. Karema, et al., Tampere University of Technology, Finland, pp. 223–227.

"Area–Efficient Multichannel Oversampled PCM Voice–Band Coder," Bosco H. Leung, et al., *IEEE Journal of Solid–State Circuits*, vol. 23, No. 23, No. 6, Dec. 1988, pp. 1351–1357.

(List continued on next page.)

*Primary Examiner*—David H. Malzahr
*Attorney, Agent, or Firm*—Joseph W. King, Jr.; Stanford and Bennett, L.L.P.

[57] ABSTRACT

The present invention is for an implementation of a multistage digital interpolator and a method of interpolation, where n/2 additions are performed, where n=the number of bits in each filter coefficient being multiplied. Scaling and multiplication of data with coefficients is performed using a common architecture. Coefficient values, having an associated scaling factor, are stored in memory. The coefficients are stored in coded form, and are then decoded prior to multiplication by the data values.

9 Claims, 7 Drawing Sheets

OTHER PUBLICATIONS

"Reduction of Quantizing Noise by Use of Feedback*," H. A. Spang, III, and P. M. Schultheiss, reprinted from *IRE Trans. Commun. Systems*, pp. 373–380, Dec. 1962.

"Design of Stable High Order 1–Bit Sigma–Delta Modulators," Tapani Ritoniemi, et al., Signal Processing Laboratory, Tampere University of Technology, reprinted from *IEEE Proc. ISCAS'90*, pp. 3267–3270, May 1990.

"A Higher Order Topology for Interpolative Modulators for Oversampling A/D Converters," Kirk C.–H. Chao, et al., reprinted from *IEEE Trans. Circuits and Sys.*, vol. CAS–37, pp. 309–318, Mar. 1990.

"A Stereo 16–Bit Delta–Sigma A/D Converter for Digital Audio*," D. R. Welland, et al., reprinted with permission from *Journal of the Audio Engineering Society*, vol. 37, pp. 476–486, Jun. 1989.

"A Monolithic 50 KHz 16–Bit A/D–D/A Converter Using Sigma–Delta Modulation," Charles D. Thompson, et al., Digital Signal Processor Operation/Motorola, Inc. 1990 IEEE.

"A CMOS Oversampling D/A Converter with a Current–Mode Semi–Digital Reconstruction Filter," D. Su and B. Wooley, *1993 ISSCC*, vol. 36, pp. 230–231.

BIT WIDTH = <NUMBER of BITS, NUMBER of INTEGER BITS>

IMPLEMENTATION OF A DIGITAL INTERPOLATION FILTER AND METHOD

BACKGROUND OF THE INVENTION

1. Field of the Invention

This invention relates to an implementation of a digital interpolation filter. More particularly, the invention relates to an implementation of a multi-stage digital interpolation filter for a digital-to-analog (D/A) converter circuit.

2. Discussion of Related Technology

Commonly utilized digital interpolation filters employ bit multiplication schemes that require hardware to perform a series of shifts and adds to multiply data by a particular filter coefficient. This typically requires the use of an adder for each group of bits to be multiplied where the number of adders is greater than one-half the number of bits of the filter coefficient to be multiplied.

These commonly utilized filters also typically do not include a common data path for multiplication and scaling of the numbers to be multiplied, and accumulation of the partial products.

SUMMARY OF INVENTION

Described herein is a novel implementation of a multi-stage digital interpolation filter and method. The present invention codes a number, preferably a filter coefficient, stores the coded number, decodes the number and performs scaling and multiplication functions upon the decoded number. This method results in a reduced requirement for adders, such that the number of required addition operations is equal to one-half the number of bits representing the known number to be multiplied, typically bits of a filter coefficient, by another number, typically the data.

The present invention utilizes a common data path for multiplication and scaling of the products and accumulation of the partial products. This greatly reduces the amount of required hardware to perform the filter calculations.

DETAILED DESCRIPTION OF THE PREFERRED EMBODIMENT

Figure 1:
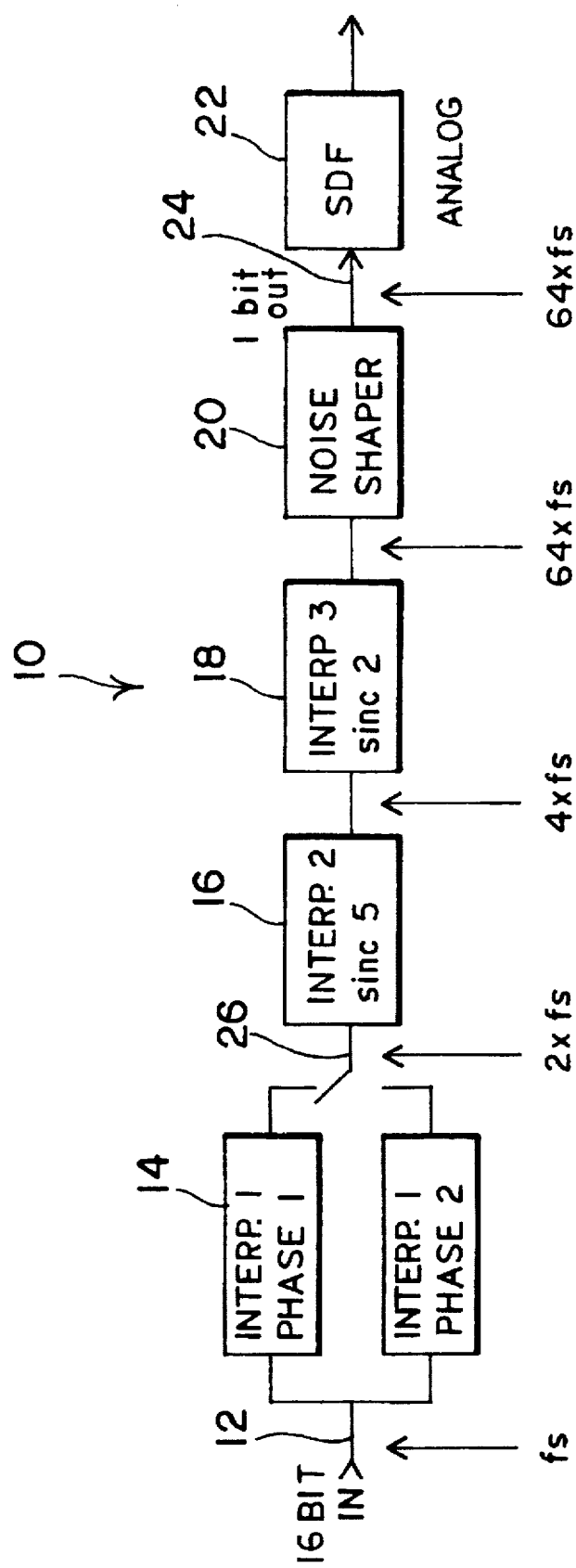
FIG. 1 is a block diagram of a D/A circuit utilizing the multi-stage interpolation filter of the present invention.

The block diagram of a D/A circuit 10 utilizing the present invention is depicted in FIG. 1. The input data 12 is interpolated from the sample frequency, Fs, to 64 times the sample rate, 64 Fs, in three stages of interpolation (14, 16, 18). The multi-stage interpolation filter structure is more fully described in application Ser. No. 08/333,399, filed Nov. 2, 1994, entitled "Digital Interpolation Circuit for a Digital-to-Analog Converter Circuit", assigned to the common assignee of the present invention and incorporated herein for all purposes. The fourth stage, a 1-bit sigma-delta noise shaper circuit 20, more fully described in application Ser. No. 08/333,386, entitled "Digital Noise Shaper Circuit," filed Nov. 2, 1994, assigned to the common assignee of the present invention and incorporated herein for all purposes, quantizes the data from a multiple bit signal to a one bit value using a fifth order system. Fourth order or other order systems may also be utilized. This quantization introduces noise which is 'shaped' via a high pass response filter function for the noise, due to quantization. This moves the noise energy to higher frequencies where it is filtered by the D/A fifth stage, 22, a semi-digital FIR filter (SDF), more fully described in application Ser. No. 08/526,834, filed Sep. 12, 1995, entitled "Combination D/A Converter and FIR Filter Utilizing Active Current Division and Method," assigned to the common assignee of the present invention and incorporated herein for all purposes. The first three interpolation stages, 14, 16 and 18, will be described herein.

The first interpolator stage, Interp. 1, 14 (phase 1 and phase 2 in combination as shown in FIG. 1), is an FIR filter with 79 taps whose data input 12 is at the sample rate of the input data Fs. The 16 bit input 12 is linear two's complement data. Interpolator 1 has a filter response preferably having a passband extending to 0.45 Fs and a cutoff band beginning at 0.55 Fs. The stopband preferably has an attenuation of at least 100 dB. The architecture of the FIR filter is linear-phase with symmetrical coefficients. The coefficient multiplication of the filter taps is implemented using a summation of multiple shifts of the filter data. Interpolator 1 interpolates by a factor of 2, and thus the filter's input has every other data equal to zero. This allows a two phase implementation where each phase is approximately half the size of the entire Interp. 1 filter.

The second stage, Interp. 2, 16, is a fifth order sinc filter. The coefficients are all integer values. Interpolator 2 operates at relatively low rates, interpolating by 2 from 2 times the sample frequency (2 Fs) to 4 times the sample frequency (4 Fs). The third stage, Interp. 3, 18, interpolates by a factor of 16. Interpolators 2 and 3 are processed by the circuit of FIG. 1 which utilizes a single data path. The 1-bit noise shaper circuit 20 quantizes the 64 Fs interpolated data to a 1 bit output 24.

Audio systems typically use two common crystal oscillator frequencies to generate standard sample rates, typically 16.934 MHz and 24.576 MHz. The standard sample rate of 44.1 KHz can be generated from a 16.934 MHz clock. The standard sample rate of 48 KHz can be generated from a 24.576 MHz clock. The highest available clock rate is typically used to calculate an output from the interpolation filters using a minimal amount of hardware. A clock is generated from the crystal oscillators to obtain a frequency equal to 256 times the sample frequency selected. The architecture of all data path blocks in Interp. 1, 2 and 3 use this clock signal of 256 times the sample frequency (Fs). The sample rate is preferably adjustable from 3.5 KHz to 48 KHz.

Figure 2:
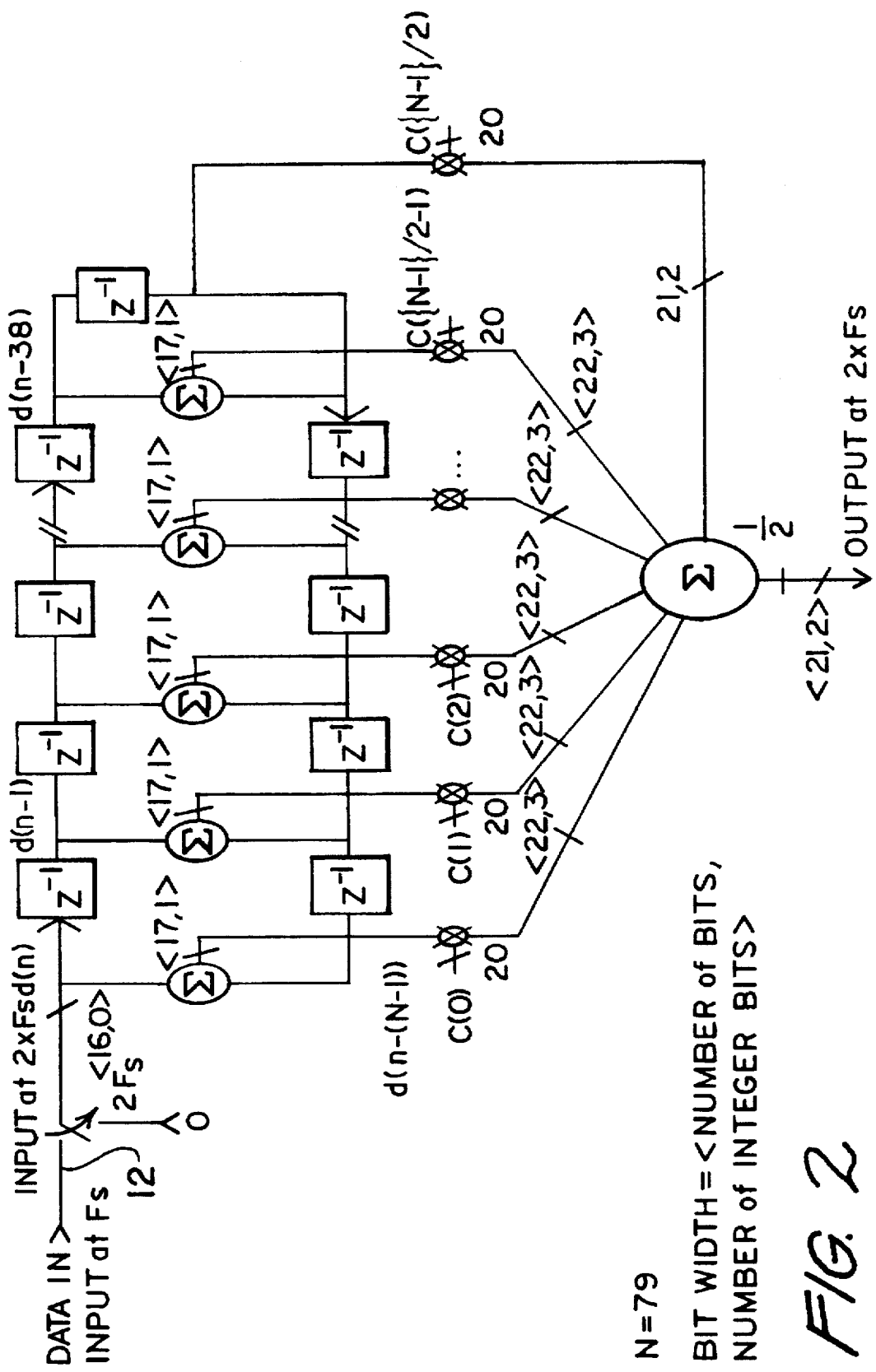
FIG. 2 is the architecture of the 79 tap FIR filter, the Interp. 1 stage of FIG. 1, which is linear-phase having symmetrical coefficients.

Shown in FIG. 2, the architecture of the 79 tap FIR filter, Interp. 1 of FIG. 1, is linear-phase with symmetrical coefficients. This symmetry allows a common folded architecture. Due to its 1:2 interpolation, the data path circuit for Interp. 1 needs only to calculate the odd coefficients for an output at 2 times the sample rate (2×Fs) and the even coefficients for the next output at 2×Fs. The equivalent processing rate amounts to calculating all 40 coefficients ($C_i$) (for a symmetrical filter with N=79) every sample period. This FIR is implemented in a block, shown in FIG. 2, where the same hardware is used to calculate both phases of the filter, one each sample period, Fs.

The architecture of FIG. 2 calculates each filter output at 2×Fs as shown in equations (1) and (2) below, where the output alternates between a $OUT_{odd}$ and $OUT_{even}$ output. The input data 12 has a dynamic range of 16 bits. The input data 12 is represented as 16 bits of fractional data, in two's complement form, which allows a full scale with respect to the input, which ranges from −1.0 to (1.0−$2^{-16}$). The magnitude of the data throughout the data path is considered with respect to this input dynamic range.

$$OUT_{even} = \Sigma C_i^* [d_{n-i} + d_{n-(N-1)+i}] \text{ for } i=0,2,4 \ldots \text{ to } 38 \quad (1)$$

$$OUT_{odd} = \Sigma C_i^* [d_{n-i} + d_{n-(N-1)+i}] + C_{39} + d_{39} \text{ for } i=1,3,5, \ldots \text{ to } 37 \quad (2)$$

where $d_n$ is the current input data and $d_{n-i} = Z^{-i} * d_n$
where N is the number of filter taps, 79

Figure 3:
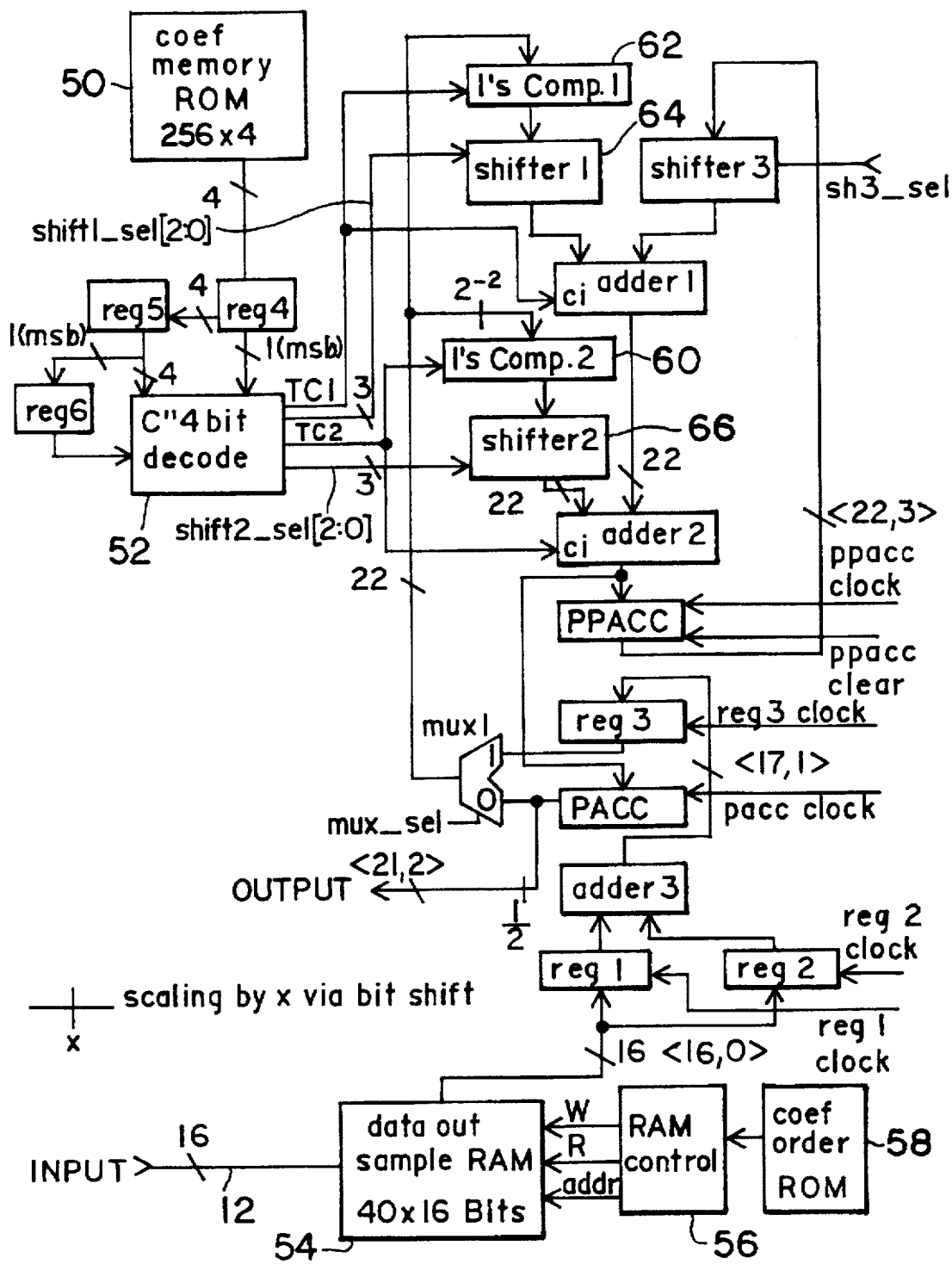
FIG. 3 is the preferred architecture block which implements the calculations for the architecture of FIG. 2.

The architecture of Interp. 1, FIG. 2, is implemented with the circuit shown in FIG. 3. The coefficient multiplication of the data in the filter taps ($d_i$) is implemented using a summation of multiple shifts of the filter data. The coefficients for the FIR filter of Interp. 1 are listed in Table 1. The technique used to implement the coefficient values is described here prior to the explanation of FIG. 3. The coefficients have varying levels of resolution to achieve the sharp transition region, from passband to stopband, of 0.1*Fs. The coefficient values in Table 1 below are given with a resolution of 20 binary bits and an exponential term. The coefficient's number, given in column 1 of Table 1, is the position of the coefficient in the filter as given by the index in equations (1) and (2). The order of execution of the coefficient multiplication, shown in Table 1, is from smallest coefficient value to largest coefficient value (smallest magnitude to the largest magnitude), for both the odd and even phase filter outputs.

This method preserves the accuracy of the smaller valued coefficients while using a constant word length. The coefficient value in Table 1, using a resolution of 20 binary bits, is stored, without the exponent in the coefficient memory ROM 50 of FIG. 3 using the Table 1 order of execution, along with a scaling factor. The scaling factor stored with each coefficient is not the exponential value of that coefficient, but is the difference between the exponential value of each coefficient and the succeeding one, using the Table 1 order of execution. This scaling factor is used to scale the accumulated products of data and coefficients to compensate for the differences in the exponential values of the 20 bit coefficients stored. Compensating the current accumulated products through multiplication of the scaling factor aligns the accumulated products with the current product of coefficient and data which makes multiplication more easily facilitated. Preferably, the scaling factors range from $2^{-0}$ to $2^{-3}$. The data path architecture allows the same circuitry in FIG. 3 to perform the coefficient multiplication and product scaling in an improved and efficient way. This allows the combination of coefficient values and scaling factors to be stored compactly in a ROM, or other memory device.

TABLE 1

Coefficients for Interpolator 1 FIR

| coef. number | coefficient value | order of execution | scaling factor stored with coef. |
|---|---|---|---|
| 1 | −.717044830322 × $2^{-12}$ | odd phase-2 | $2^{-2}$ |
| 2 | −.587711334229 × $2^{-10}$ | even phase-1 | $2^{-0}$ |
| 3 | −.527700424194 × $2^{-10}$ | odd phase-4 | $2^{-0}$ |
| 4 | .841259002686 × $2^{-10}$ | even phase-2 | $2^{-0}$ |
| 5 | .620119094849 × $2^{-8}$ | odd phase-8 | $2^{-0}$ |
| 6 | .888801574707 × $2^{-9}$ | even phase-3 | $2^{-1}$ |
| 7 | −.584827423096 × $2^{-9}$ | odd phase-5 | $2^{-0}$ |
| 8 | −.508468627930 × $2^{-8}$ | even phase-4 | $2^{-0}$ |
| 9 | .589366912842 × $2^{-9}$ | odd phase-9 | $2^{-0}$ |
| 10 | .791526794434 × $2^{-8}$ | even phase-5 | $2^{-1}$ |
| 11 | −.561088562012 × $2^{-10}$ | odd phase-4 | $2^{-1}$ |
| 12 | −.514154434204 × $2^{-7}$ | even phase-6 | $2^{-0}$ |
| 13 | −.938863754272 × $2^{-14}$ | odd phase-1 | $2^{-2}$ |
| 14 | .672943115234 × $2^{-7}$ | even phase-7 | $2^{-0}$ |
| 15 | .563703536987 × $2^{-7}$ | odd phase-7 | $2^{-1}$ |
| 16 | −.840948104858 × $2^{-7}$ | even phase-8 | $2^{-0}$ |
| 17 | −.651086807251 × $2^{-8}$ | odd phase-9 | $2^{-1}$ |
| 18 | .512119293213 × $2^{-6}$ | even phase-10 | $2^{-0}$ |
| 19 | .582284927368 × $2^{-7}$ | odd phase-10 | $2^{-0}$ |
| 20 | −.605270385742 × $2^{-6}$ | even phase-11 | $2^{-0}$ |
| 21 | −.923715591431 × $2^{-7}$ | odd phase-11 | $2^{-1}$ |
| 22 | .696113586426 × $2^{-6}$ | even phase-12 | $2^{-0}$ |
| 23 | .685438156128 × $2^{-6}$ | odd phase-12 | $2^{-0}$ |
| 24 | −.777814865112 × $2^{-6}$ | even phase-13 | $2^{-0}$ |
| 25 | −.975055694580 × $2^{-6}$ | odd phase-13 | $2^{-1}$ |
| 26 | .841688156128 × $2^{-6}$ | even phase-14 | $2^{-0}$ |
| 27 | .675539106724 × $2^{-5}$ | odd phase-14 | $2^{-0}$ |
| 28 | −.873836517334 × $2^{-6}$ | even phase-15 | $2^{-0}$ |
| 29 | −.923152923584 × $2^{-5}$ | odd phase-15 | $2^{-1}$ |
| 30 | .849981307983 × $2^{-6}$ | even phase-16 | $2^{-0}$ |
| 31 | .629726409912 × $2^{-4}$ | odd phase-16 | $2^{-0}$ |
| 32 | −.720279693604 × $2^{-6}$ | even phase-17 | $2^{-0}$ |
| 33 | −.870679855347 × $2^{-4}$ | odd phase-17 | $2^{-1}$ |
| 34 | .720285415649 × $2^{-7}$ | even phase-9 | $2^{-1}$ |
| 35 | .623207092285 × $2^{-3}$ | odd phase-18 | $2^{-0}$ |
| 36 | .625934600830 × $2^{-6}$ | even phase-18 | $2^{-2}$ |
| 37 | −.953193664551 × $2^{-3}$ | odd phase-19 | $2^{-1}$ |
| 38 | −.996269226074 × $2^{-4}$ | even phase-19 | $2^{-3}$ |
| 39 | .782382965088 × $2^{-2}$ | odd phase-20 | $2^{-2}$ |
| 40 | .697450637817 × $2^{-1}$ | even phase-20 | $2^{-1}$ |

For an efficient calculation of the product of a coefficient and data, the coefficients are stored in a ROM using a coded canonical format. Using canonical representation of the coefficients reduces the number of non-zero bits in memory. This reduces the number of summations needed to form the product of the coefficient and data. The definition of these bits are given in equations (4) and (5), below.

Each coefficient's 20 binary bit mantissa (C') of Table 1 is represented in canonical notation as:

$$C' = \Sigma b_j 2^{-j} \quad (3)$$

where $b_j \in (-1, 0, 1)$, j=0–19 with j=0 being the MSB

This results in a coefficient having a minimum number of non-zero bits in accordance with the well known canonical notation. Each 20 binary bit mantissa C', is stored in memory and is coded as follows, with $C_j''$ representing each coded bit in the stored coefficient, as follows:

$$C_j'' = 1 \text{ for } b_j = 1, \text{ where} \quad (4)$$

$$C_{j-1}'' = C_j'' = 1 \text{ for } b_j = -1, \text{ where } j=0-19, \quad (5)$$

since $b_j * b_{j-1} = 0$ for canonical representation. Thus, the zero to the left of a canonical '−1' bit is changed to a '1', and the '−1' is changed to a '1', resulting in a binary representation (0,1).

The coefficients can not be stored directly in a ROM in canonical form since each bit can take on one of three values. Thus, coefficients are stored as the coded C"$_j$ bits, directly. For 20 bits of resolution in the coefficients, 21 bits need to be stored to allow the MSB to be coded when equal to '−1'. This results in simple decoding of the coefficient values without separating negative and positive canonical bits and having to store them separately. Using this coded canonical format maintains a minimum number of non-zero bits when the coefficient is decoded. Since canonical representation has, at most, one half the digits having non-zero values, this representation requires the maximum number of additions to be one half the number of bits used to represent the coefficient.

Since a shift and add scheme is used to calculate the products of the coefficient and the data, as given above in equations (1) and (2), the same shifting circuitry is used to scale the product by storing additional bits along with the 20 binary bits as coded, using equations (4) and (5). In the preferred implementation, 3 scaling bits are stored, which are decoded and used to compensate for the coefficient scaling factor from Table 1. This approach requires 40 coef.*(21 bits/coef.+3 bits for partial product shifts)=960 bits to be stored in the coefficient memory ROM of FIG. 3.

To calculate an output from the Interp. 1 filter when the sample rate can be up to 48 KHz in audio systems using a crystal oscillator which commonly operates at 16.934 MHz or 24.576 MHz, a scheme is needed to perform the 40 multiply/accumulate operations, along with the shifting operations needed, to compensate for the scaled coefficients in one sample period. To use an architecture without a multiplier, typically a bit serial method is used to perform the multiplication task. This involves reading each bit of the coefficient from the least significant bit (LSB) to most significant bit (MSB). For each bit of the coefficient that is a '1', the data is added in an accumulator. The value in the accumulator is then shifted by one, equivalent to a multiplication by $2^{-1}$, prior to the next data value being added. This bit serial implementation does not have the throughput needed using the frequencies mentioned above for audio rates.

The method used herein operates on 4 bits of a coefficient at a time, LSB to MSB. Since the coefficients are coded as mentioned above, to operate on 4 bits, C"$_j$–C"$_{j-3}$, the LSB of the next 4 bits, C"$_{j-4}$ is needed to decode the sign of the C"$_{j-3}$ bit. See equations 4 and (5). To decode the bit C"$_j$, of the stored coefficient, C", the sign and magnitude of the MSB from the previous 4 bits is needed. Register 6 of FIG. 3 facilities this since it holds the coded bit, C"$_{j+1}$, 1 LSB away from the current 4 bits being decoded. The decoded sign of the bit in register 6 is stored in 'C" 4 bit decode block 52. These seven bits: C"$_{j+1}$, the sign of C"$_{j+1}$, and C"$_j$–C"$_{j-4}$, are made available to decode the C"$_j$–C"$_{j-3}$ bits by always reading ahead 4 bits. The coefficient bits are read out of the 'coef memory ROM' 50 4 bits at a time into register 4 where j=19, 15, 11, 7, and 3.

Below are the logic equations (6)–(12) used to calculate the amount of shift needed to calculate the current data. The amount of shift is determined from the decoding of the current 4 stored coded coefficient bits and is used to control 'shifter 1' and 'shifter 2' of FIG. 3 with 'shift1_sel[2:0]': The four coefficient bits determine five possibilities for 'shifter_1' and 'shifter_2' of FIG. 3. Possible values for shifting the data using 'shifter_1' and 'shifter_2', are $2^0$, $2^{-1}$, $2^{-2}$, $2^{-3}$ and outputing zero. The shifts of $2^0$ and $2^{-1}$ are implemented in shifter 1 of FIG. 3. The shifts of $2^{-2}$ and $2^{-3}$ are implemented in shifter 2 of FIG. 3. If one of the shifters is not needed, it outputs zero. Both shifters may output zero if all the coefficient bits being decoded are zero. Since the decoded coefficient bits may take on the values of (−1, 0, or 1), the two's complement signals TC1 and TC2 are decoded, as per equations (11) and (12), respectively, to determine whether the data sum is inverted.

The new value of the sign of C"$_{j+1}$, is determined as follows:

r6_sign=r4[0] & r5[3] & ~r5[2]|| r4[0] & r5[3] & r5[2] & r5[1]& ~r5[0]|| r4[0] & r5[3] & r5[2] & r5[1] & r5[0] & r6_sign     (6)

The possible shifts are decoded as follows:

shift_0 = (r5[3] & ~r5[2]||    (7)
(r5[3] & r5[2] & r5[1] & ~%r5[0])||
(r5[3] & r5[2] & r5[1] & r5[0] r6 & r6_sign)

shift_1 = (r5[2] & ~r5[1])||    (8)
(r5[2] & r5[1] r5[0] & ~r6)||
(r5[2] & r5[1] & r5[0] & r6 & ~r6_sign)

shift_2 = (r5[1] & ~r5[0])||    (9)
(r5[1] & r5[0] & r6 & r6_sign)

shift_3 = (r5[0] & r6 & ~r6_sign)||    (10)
(r5[0] & ~r6)

TC1 = (r4[0] & r5[3]|| & (r5[3] & r5[2] & shift_1)    (11)
TC2 = (r5[2] & r5[1]|| & (r5[1] & r5[0] & shift_3)    (12)

where shift_x causes a bit shift equivalent to 2* in shifter 1 and shifter 2, and where:

the symbol '~' is the a logical inversion, the symbol '||' is the logical OR function, and the symbol '&' is the logical AND function.

The following describes the calculation of the output of Interp. 1 using the architecture depicted in FIG. 3. The output 26 of Interp. 1 (FIG. 1) is calculated by outputing a result using the even phased coefficients of Table 1 followed by outputing a result using the odd phased coefficients of Table 1, as given in equations (1) and (2). The first values read out of the 'coef memory ROM' 50 of FIG. 3 are the 4 LSBs of coefficient C"2, C"2$_{16-19}$, since C"2 is the first coefficient executed according to the order of execution identified in Table 1, where the number '2' is the coefficient number from Table 1.

The data to be multiplied by C"2 are stored in the 'sample RAM' 54 of FIG. 3. The 'RAM control' block, uses data from the 'coef order ROM' 58. This ROM 58 stores the order of coefficient execution, as given in Table 1, and is read once per coefficient. The execution order is used to calculate the address of the 'sample RAM' 54 to read the 2 data values to be summed for multiplication by a coefficient as given in equations (1) and (2). The 'sample RAM' 54 is read for the first data value, $d_{n-2}$, which is stored in register 1.

On the next clock cycle, the second data value, $d_{n-(79-1)+2}$, is read from 'sample RAM' 54 and stored in register 2. When the second data is read from the 'sample RAM 54, the first four LSBs of the coefficient are stored in register 4, C"2$_{16-19}$.

During the next clock cycle, the two data values previously read and stored in reg 1 and reg 2 are added in 'adder 3' to form the data sum to be multiplied by the coefficient. The data sum is then stored in register 3. The coefficient 4 bits stored in register 4 are transferred into register 5 while the next coefficient 4 bits, C"2$_{12-15}$, are latched in register 4. The MSB of the 4 bits in register 5 is transferred into register 6, which would initially be 0 from reset. Internal to the 'C" 4 bit Decode block' 52 of FIG. 3, the sign of the MSB in reg 5 is stored from the previous decode, as r6__sign. Initially, this value would also be 0 from reset. With the previous MSB bit decoded as a +1 or −1, the decode of the next 4 bits is accomplished with a simple decode circuit (not shown), as per equations (6)–(12). As explained above, a total of seven bits of information are used to decoded the 4 C" bits to be multiplied by the data sum, to form a partial product as follows:

$$PP_{j-(C''_j-j-3)} * (\text{data}) \tag{13}$$

where j=bit positions (19, 15, 11, 7 and 3); where j=0 is the MSB and j=19 is the LSB. The product of the 20 bit coefficient multiplied by the 17 bit data sum from reg. 3 is calculated in the following manner:

$$P=((((((PP_{19} \times 2^{-4})+PP_{15}) \times 2^{-4})+PP_{11}) \times 2^{-4})+PP_7) \times 2^{-4})+PP_3 \text{ or equivalent,}$$

$$P = \sum_{j=19,j=j-4}^{3} PP_{j-4} * 2^{-4} + PP_j \text{ for } j = 19,15,11,7,3 \tag{14}$$

In summary, the 4 bits coefficient in register 5, $C''_j$–$C''_{j-3}$, the MSB bit in register 6, $C''_{j+1}$, the sign of $C''_{j+1}$ stored in the 'C" 4 bit decode' block 52 of FIG. 3, and the MSB bit in register 4, which represents the $C''_{j-4}$ bit, are made available to the 'C" 4 bit decode' block 52 of FIG. 3.

The coded canonical coefficients stored in coefficient memory ROM 50 (FIG. 3), when decoded, result in at most two non-zero bits in any field of 4 coefficient bits in each coefficient C". This results in at most two shifted data values that need to be added together to form the partial product shown in equation (13). This scheme uses adders 1 and 2 of FIG. 3 to evaluate 4 coefficient bits per clock cycle. This results in using half as many adders as the number of coefficient bits read in one cycle when reading an even number of bits each cycle, which is preferred.

The "C" 4 bit decode' block 52 outputs 1 bit, TC1, to the '1's comp 1' block 62 and the carry in (ci) of 'adder 1' when the sign of the decoded bit of $C''_j$ or $C''_{j-1}$ from equation (3) is negative. Three additional bits are output from the 'C" 4 bit decode' 'block 52 to the 'shifter 1' block which determine if shifter 1 will output zeroes (blank), or perform no shifting ($2^{-0}$) on the output of 'mux 1', or shift the data by 1 bit valve 1 ($2^{-1}$). Three different bits are output from the 'C" 4 bit decode' block 52 to the 'shifter 2' block 66 which determine if shifter 2 will output zeroes (blank), or perform no shifting ($2^{-0}$) on the output of 'mux 1', or shift the data by 1 bit valve ($2^{-1}$). Decoded bits $C''_{j-2}$ and $C''_{j-3}$ determine the sign and the shift through the '1's comp 2' 60 and 'shifter 2' 66 blocks. The fixed shift $2^{-2}$ into the '1's comp 2' block 60 allows 'shifter 2' 66 to implement shifts of $2^{-2}$ and $2^{-3}$. During the coefficient multiplication, mux1__sel=1 to select the data in register 3. The output of 'shifter 1', is added to the output of 'shifter 3' in adder 1.

The partial product accumulator register 'ppacc' is reset on the beginning of the new coefficients multiplication. When the 4 LSBs of each coefficient $C''_j$–$C''_{j-3}$ are decoded, register 'ppacc' is equal to zero and the output of 'shifter 3' is equal to zero. The output of adder 1 is added to the output of 'shifter 2' in 'adder 2'.

Initially, the first 4 coefficient bits read from the coefficient memory ROM 50 are the LSBs from coefficient number 2, $C''2_{16-19}$, as given by the order of execution for the even phase in Table 1. These 4 bits are stored in register r4. The partial product of the coefficient and data sum of equation (13), from adder 2, is stored in register 'ppacc'. Since a new product is now being calculated, the 'ppacc' register is cleared by a control block, not shown, via the 'ppacc' clear signal.

On the next clock cycle, these 4 coefficient bits are latched into register r5 and the next 4 coefficient bits, $C''2_{12-15}$, are read out of the 'coeff. memory ROM' 50 and stored in register r4. The 4 coefficient bits in register r5 are then decoded and used to control shifting and inverting of the data in register r3, as per equations (6)–(10), as previously explained.

This partial product, $PP2_{16}=(C''2_{16-19})* (d_{n-2}+d_{n-(79-1)+2})$ is stored in register 'ppacc' on the next clock cycle. The MSB of register 5 is stored in register 6, the 4 bits in register 4 are stored in register 5, and the next 4 coefficient bits $C''2$, $C''2_{8-11}$, are read into register 4. The second 4 LSBs, $C''2_{12-15}$, are decoded to control 'shifter 1' and 'shifter 2' and used to shift the data in register 3 according to the decoded bits. The 'shifter 3' block is controlled by the 'sh3__sel' signal to shift the output of 'ppacc' by $2^{-4}$. This scales the current partial product stored in 'ppacc' to the partial product currently being calculated, as shown in equation (14), above.

On the next clock cycle, the sum of 'shifter 1', 'shifter 2' and 'shifter 3' is stored in 'ppacc' as the new accumulated partial product, $PP2_{12}=(C''2_{12-16})* (d_{n-2}+d_{n-(79-1)+2})+PP2_{16}* 2^{-4}$. The MSB of register 5 is stored in register 6, the 4 coefficient bits in register 4 are stored in register 5, and the next 4 coefficient bits of $C''2$, $C''2_{4-7}$, are read into register 4. The decode of $C''2_{8-11}$, now in register 5, controls 'shifter 1' and 'shifter 2' which shifts the data sum previously output from register 3. The 'shifter 3' block is controlled by the 'sh3__sel' signal to shift the output of 'ppacc' by $2^{-4}$.

On the next clock cycle, the sum of 'shifter 1', 'shifter 2', and 'shifter 3' is stored in 'ppacc' as the new accumulated partial product. $PP2_8=(C2_{8-11})* (d_{n-(79-1)+2})+PP2_{12}*2^{-4}$. The MSB of register 5 is stored in register 6, the 4 coefficient bits in register 4 are stored in register 5, and the next 4 coefficient bits $C''2$, $C''2_{0-3}$, are read into register 4. The decode of $C''2_{4-7}$, now in register 5, controls 'shifter 1' and 'shifter 2' which shifts the data sum previously output from register 3. The 'shifter 3' block is controlled by the 'sh3__sel' signal to shift the output of 'ppacc' by $2^{-4}$.

On the next clock cycle, the sum of 'shifter 1', 'shifter 2', and shifter 3' is stored in 'ppacc' as the new accumulated partial product, $PP2_4=(C2_{4-7})*(d_{n-2}+d_{n-(79-1)+2})+PP2_8*2^{-4}$. Since the last of the 20 bits of the coefficient has been read out of the 'coef memory ROM' 50, the next 4 coefficient bits read from the coefficient memory ROM 50 are: the MSB of the coded coefficient, and the scaling factor (3 bits) as identified in Table 1.

The second coefficient multiplication to be executed for the even phase output of the filter is coefficient C4, as given by Table 1. The exponent of C2 and C4 are the same, and therefore the scaling factor associated with C2 is zero. In general, the 3 bit scaling factor is read into register 4. The decode of $C''2_{0-3}$, now in register 5, controls 'shifter 1' and 'shifter 2' which shift the data sum previously output from register 3. The 'shifter 3' block is controlled by the 'sh3__sel' signal to shift the data sum previously output from 'ppacc' by $2^{-4}$. The first data, $d_{n-4}$, needed for multiplication by the coefficient for the even phase filter output, C4, is read from the 'sample RAM' 54 and stored in register 1.

On the next clock cycle, the sum of 'shifter 1', 'shifter 2', and 'shifter 3' is stored in 'pace' as the final product, $PP2_0=(C2_{0-3})* (d_{n-2}+d_{n-(79-1)+2})+PP2_4* 2^{-4}=P2=(C-2'')* (d_{n-2}+d_{n-(79-1)+2})$. The 3 bits of scaling stored with coefficient $C''2$ are loaded into register 5. The 4 LSBs of the next coefficient, $C''4_{16-19}$, are read into register 4 in preparation for multiplication by the appropriate data, as given by equation (1). The second data value, $d_{n-(79-1)+4}$, is read from the 'sample RAM' 54 and loaded into register 2. The 'C" 4 bit decode' block 52 clears register 6 and the stored sign of register 6 for the decoding of the scaling value, so the previous coefficient data does not effect the decode of the 3 scaling bits. This allows the same decode circuit to be used to decode the coefficient bits and the coefficient scaling bits.

The product accumulator register 'pacc' is used to store the accumulated value of the partial products of coefficients and data from equations (1) and (2) and initially contains 0. During this clock cycle, mux1_sel=0 to allow 'shifter 1' and 'shifter 2' to shift the resultant sum of products stored in 'pacc' to compensate for the differences in the exponential values for the coefficients in Table 1. This is the scaling factor. After each final product of coefficient and data is obtained, the amount of scaling applied to the product accumulator register 'pacc' is between $2^0$ and $2^{-3}$. This defines the maximum difference in the scaling between two coefficients. The data output from 'pacc' is scaled by 'shifter 1' and 'shifter 2'. The control signal sh3_sel=0 causes 'shifter 3' to not shift the 'pacc' value. The output of 'adder 2' is the sum of the value in 'pacc' and the current product, P2.

On the next clock cycle, the new accumulated value, initially the product P2, is stored in 'pacc'. These six clock cycles conclude the calculation of the first product.

The next 4 LSBs of the coefficient, $C"4_{12-15}$, are read into register 4 while the contents of register 4 are loaded into register 5. The partial product accumulator register 'ppacc' is cleared and mux1_sel=1 to select the data sum in register 3 for multiplication by coefficient C4. The LSBs now in register 5 are decoded and used to shift register 3. This allows the product of each 20 bit coefficient multiplied by the sum of the filter tap data, as defined in equations (1) and (2), to be evaluated in 5 clock cycles, plus 1 cycle for accumulation of products and shifting the product to compensate for the increasing magnitude in the coefficients, C, reflected in the magnitude of the exponential values of the coefficients in Table 1. This method makes the best use of the available bit width to maintain the accuracy of the coefficients on the final output of Interp. 1 by truncating after each summation of products having the same magnitude.

In summary, the entire Interp. 1 filter 14 (FIG. 1) is implemented in this manner by taking the current result of the accumulated products of coefficient and data that is stored in the product accumulator, 'pacc' of FIG. 3 and shifting it according to the scaling factor for each coefficient and adding the current product. When all the products of the coefficients and data as given in equation (1) are complete, the output of the Interp. 1 filter is latched by the next interpolation stage, Interp. 2, 16, at twice the sample rate, 2×Fs. During the calculation of the Interp. 1 output from the odd phase coefficients, as given in equation (2), the RAM control block 56 (FIG. 3) is used to read data from the sample RAM 54 such that during one such calculation, only one data value is read, since this value is the center tap of the Interp. 1 filter which is multiplied by coefficient $C_{39}$.

Regarding the sample RAM block 54 addressing, the input data 12 is written into the sample RAM 54 at the sample rate FS. A write pointer is used by the RAM control block 56 to keep track of the current next available address, writing over old data at the proper time. A read pointer is used by the RAM control block 56 to calculate the addresses of the Interp. 1 filter tap data, $d_j$, and $d_{n-(N-1)-i}$, from equations (1) and (2). The read pointer monitors the write pointer and the current coefficient to be multiplied by the filter taps. As in Table 1, the order of calculating the products of coefficients and data is based on the magnitude of the coefficient. This order of execution, from Table 1, is stored in the coefficient order ROM 58 of FIG. 3 and is used by the sample RAM read pointer to read the proper data values from sample RAM 54. The coefficient order ROM 58 is read directly into the RAM control block 56 of FIG. 3. Since the coefficient multiplication takes 6 cycles, as described above, every 6 cycles two new data values are read out of the sample RAM 54 and loaded into registers 1 & 2, except for multiplication of coefficient $C_{39}$ during the calculation of the odd phase Interp. 1 output, described above and shown in equation (2). The two data values read from the sample RAM 54 are added together in adder 3 then stored in register 3. This performs the addition of the data values in equations (1) and (2) that resulted from the symmetrical coefficient values of Table 1. Register 3 is input into the '1's comp. 1' and '1's comp. 2' blocks for each of the 5 sets of 4 coefficients bits decoded from each 20 bit interpolation filter coefficient.

Interpolator 2, 16, shown in FIG. 1, is a fifth order sinc interpolating filter. The filter interpolates by a factor of 2, from twice the sample frequency (2 Fs) to four times the sample frequency (4 Fs). The input of Interp. 2 is the signal output from Interp. 1. The transfer function of Interp. 2 is given by:

$$H_2(z) = \frac{1}{32} [1 + z^{-1}]^5 \tag{15}$$

which can be expanded to:

$$H_2(z) = \left( \frac{1}{2} \ \frac{1-z^{-2}}{1-z^{-1}} \right)^5 = \frac{1}{32} (1+z^{-1})^5 = \tag{16}$$

$$\frac{1}{32} (1 + 5Z^{-1} + 10Z^{-2} + 10Z^{-3} + 5Z^{-4} + Z^{-5})$$

at the output frequency of 4 Fs. Since every other sample is zero, due to the 2× interpolation, calculating only the significant terms at the input frequency of 2 Fs yields two separate transfer functions which are calculated at a rate of 0.5 Fs. Each transfer function, $H_{2A}$ and $H_{2B}$, contribute to the Interpolator 2 output at 4 Fs. The transfer functions in equations (17) and (18) are scaled by a factor of 2 to scale the data for calculating the terms of the transfer function. The transfer functions, as scaled and as implemented in the preferred embodiment, are given in equations (19) and (20).

$$H_{2A}(z) = \frac{1}{32} [1 + 10Z^{-1} + 5Z^{-2}] \tag{17}$$

$$H_{2B}(z) = \frac{1}{32} [5 + 10Z^{-1} + Z^{-2}] \tag{18}$$

$$H_{2A}(z) = 2*H_{2A} = \frac{1}{16} [1 + 10Z^{-1} + 5Z^{-2}] \tag{19}$$

$$H_{2B}(z) = 2*H_{2B} = \frac{1}{16} [5 + 10Z^{-1} + Z^{-2}] \tag{20}$$

Interpolator 3, 18, (FIG. 1), is a second order sinc filter, having a differential delay of 2, and a transfer function of:

$$H_3(z) = \left[ \frac{1}{32} \ \frac{(1-z^{-32})}{(1-z^{-1})} \right]^2 \tag{21}$$

Figure 4:
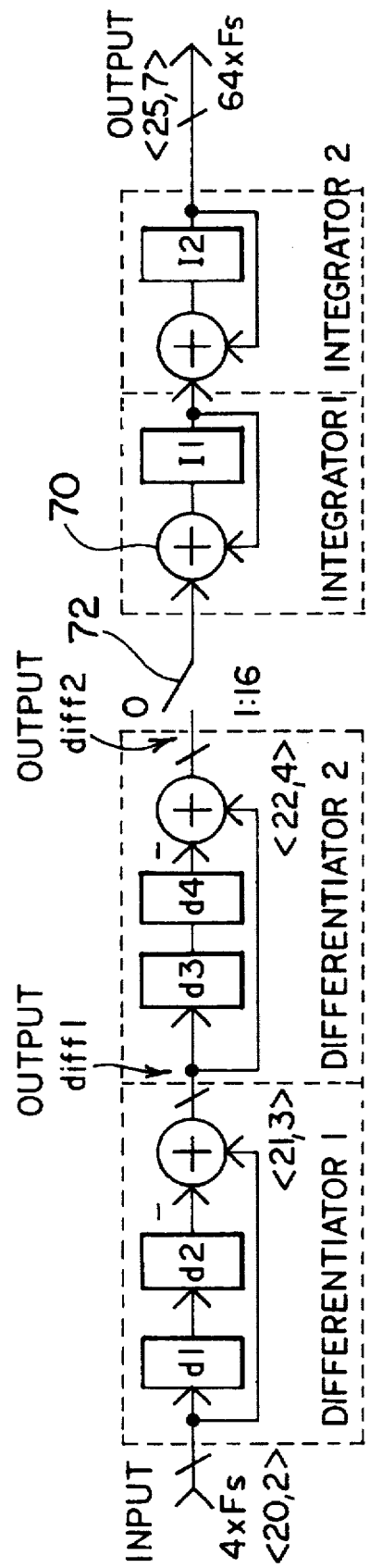
FIG. 4 is an embodiment of the functional block for the Interp. 3 stage.

The block diagram given for Interp. 3 is depicted in FIG. 4. The interpolation factor for Interp. 3 is 16, where the input of Interp. 3, which is output from Interp. 2, is 4 times the sample frequency (4 Fs). There are two differentiating stages included in Interp. 3 both operating at 4 Fs. The first stage uses differentiators 'd1' and 'd2' of FIG.4 and generates the output 'diff1'. The second stage, using differentiators 'd3' and 'd4' of FIG. 4, generates the output 'diff2' at 4 Fs.

Figure 5:
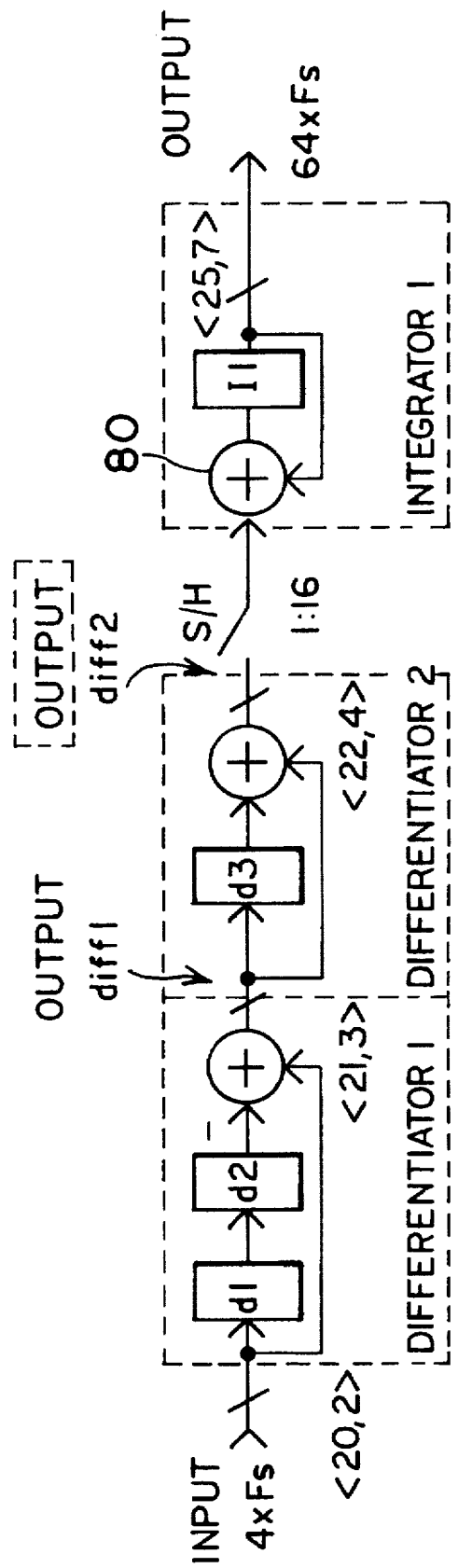
FIG. 5 is the preferred embodiment of the functional block for the Interp. 3 stage.

An up-sampling by 16 is performed following the output of 'diff2' where one 'diff2' value is passed to the adder 70 prior to register 'I1' of Integrator 1, followed by 15 zeroes, at the rate of 64 Fs. Since the integrator 'I1' of FIG. 4 accumulates one 'diff2' value followed by 15 zeroes, it can be moved to the slower side, or left-hand side, of the up-sampling by 16 switch 72, using the commutative rule. Integrator 1 can now accumulate the value 'diff2' at the lower rate while its output is used by Integrator 2 16 times at the higher rate. This effectively replaces the up-sampling by 16 and zero padding shown in FIG.4 which interpolates with zeroes with a sample and hold function switch 72. The reduced block for Interp. 3 is shown in FIG. 5.

The Integrator 2 has the transfer function of equation (22). The transfer function of the differentiator 2 is given in equation (23). By multiplying the transfer functions of Integrator 1 in equation (22) and differentiator 2, the resulting transfer function is shown in equation (24). A reduced transfer function and block diagram result, as shown in FIG. 5, which is implemented in the preferred embodiment.

$$H_{I1}(z) = \left| \frac{1}{1-Z^{-1}} \right| \quad (22)$$

$$H_{diff2}(Z) = 1 - Z^{-2} = 1 + Z^{-1} * 1 - Z^{-1} \quad (23)$$

$$H_{diff2 \cdot I1}(Z) = 1 + Z^{-1} * 1 - Z^{-1} * \left| \frac{1}{1-Z^{-1}} \right| = 1 + Z^{-1} \quad (24)$$

Only one integrator, Integrator 1, of Interp. 3 operates at the 64 Fs rate, while differentiators 1 and 2 of Interp. 3, and all of Integrator 2, are calculated at the slower rate of 4 Fs. The clock rate of the state machine controlling the data path is at 256 times the sample rate (256 Fs).

Figure 6:
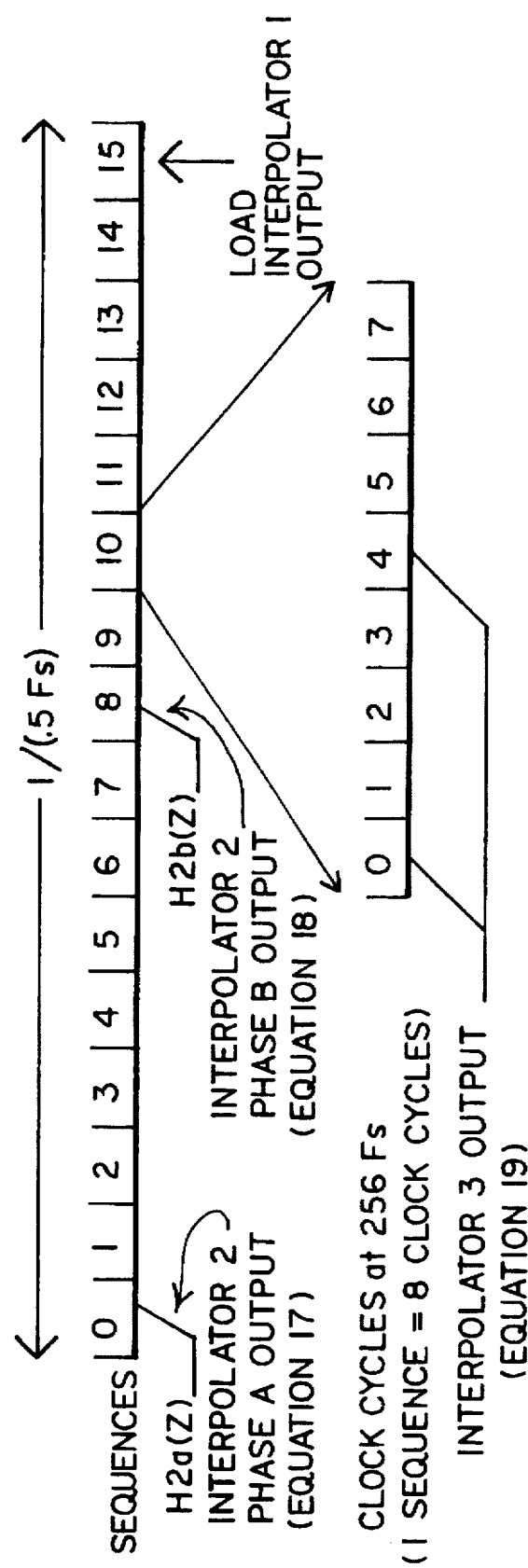
FIG. 6 is a timing diagram depicting the 16 sequences (0–15) and the 8 cycles (0–7) within each sequence to illustrate when various outputs of the Interp. 1 stage are available.
Figure 7:
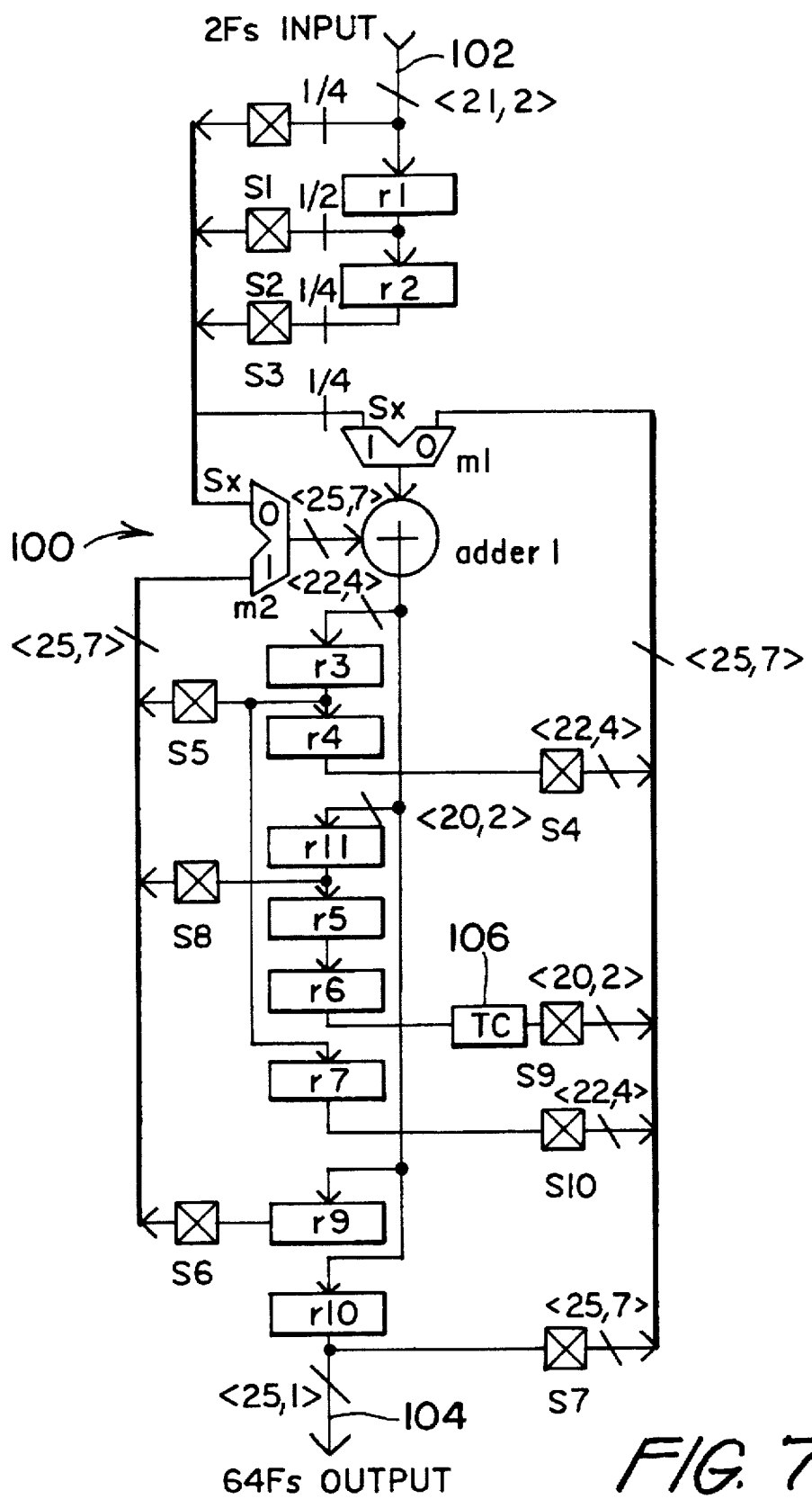
FIG. 7 is the preferred single data path architecture implementing the Interp. 2 and Interp. 3 stages.

The outputs of Interp. 2 and Interp. 3 are calculated using the single data path architecture 100, depicted in FIG. 7. A sequence of 8 clock cycles, at 256 Fs, is repeated 16 times for a total of ½ of one sample period, 1/(0.5 Fs). This set of 16 sequences is repeated to implement the calculations of Interp. 2 equations (12) and (13) and Interp. 3 equation (14). A summary of the calculations performed by the data path architecture 100 of FIG. 7, and the rate at which the output of the interpolators are computed, are shown in FIG. 6.

On each sequence 15, which occurs at a rate of 2 Fs, the output of Interp. 1 is input into the 2 Fs input 102 of the single data path architecture 100 FIG. 7, which implements Interps. 2 and 3. As shown in FIG. 6, every eighth sequence, which occurs every 4 Fs, an output of Interp. 2 is calculated. During sequence 0, a phase A of the transfer function in equation (17) is calculated. During sequence 8, a phase B of the transfer function in equation (18) is calculated. Both calculations contribute to the entire Interp. 2 transfer function of equation (16) at 4 Fs.

As shown in FIG. 6, each sequence includes 8 clock cycles. During each sequence, on cycles 0 and 4 of FIG. 6, the register I1 of Integrator 1 (FIG.5) stores the output of adder 80 to form a new Interp. 3 output. Since this sequence is repeated 16 times for a total rate of ½ Fs, a total of 32 interpolator outputs from Interp. 3 occur per ½ sample period for a total of 64 output values every sample period (1/Fs).

The operation of the data path architecture 100 shown in FIG. 7, implements Interp. 2 and Interp. 3, will be described. The data path of FIG. 7 is controlled by a control circuit (not shown) clocked at 256 Fs. The clocks to registers r1–r7 and r9–r11 of FIG. 7 are generated by the control circuit and are not clocked continuously. The switches s1–s10 of FIG. 7 and the select inputs of mux 'm2' and 'm1' are also controlled by the control circuit. The switches, implemented as transmission gates or tristate drivers, are closed when their inputs are equal to 1.

The 2 Fs input 102 of FIG. 7 is output from Interp. 1. In FIG. 7, registers 'r1' and 'r2' are used to store the output of Interp. 1. Registers 'r1' and 'r2' are clocked only during sequence 15 on cycle 7 per FIG. 6. The switches 's1', 's2' and 's3' of FIG. 7 make the data output from Interp. 1 available to mux 'm2' as a direct input, or delayed by one or two values, for use in calculating equations (19) or (20). The registers 'r3' and 'r4' are used for holding partial calculations of Interp. 2 when computing the output according to equations (19) and (20). Register 'r11' is used to store the outputs of Interp. 2 as given by equations (19) and (20).

During sequence 0, r11 stores the phase A, $H_{2A}(Z)$ output, and during sequence 8, r11 stores the phase B, $H_{2B}(Z)$ output, of equations (19) and (20), respectively. Registers 'r5', 'r6', 'r7' store the values in the registers 'd1', 'd2' and 'd3', respectively, as shown in FIG. 5 for Interp. 3. Register 'r9' holds the output of differentiator 2, 'diff2', and performs the sample and hold function by holding the value of 'diff2' for input to integrator 1 of FIG. 5. Register 'r10', which implements register I1 of FIG. 5, holds the data of integrator 1 of FIG. 5.

The control signals to the data path architecture 100 of FIG. 7 are used to perform the calculations of equations (19), (20) and (21). The cycle number and sequence number, as shown in FIG. 6, are used to determine the data flow. The operations performed in each clock cycle depend on the sequence number and cycle number. A description of when each calculation occurs using FIG. 7 and the function of the elements of FIG. 7 for each clock cycle is now described.

Starting with the loading of the Interp. 1 output, during sequence 15, cycle 7, registers 'r1' and 'r2' are clocked storing a new value. Also, in this cycle, register 'r3' is clocked storing a new value of the output of differentiator 1, 'diff1', of Interp. 3 of FIG. 5. In this cycle, referring to FIG. 7, s5, s10 and m2_select=1. This causes the differentiator output 'diff1' value of FIG. 5 stored in 'r3' of FIG. 7 to be added to the previously stored 'diff3' value in 'r7'.

After sequence 15 cycle 7, the sequence counter and cycle counter roll over to sequence 0 cycle 0. During this clock cycle, on every sequence from FIG. 7, s6, s7 and m2_select=1, while m1_select=0. This causes the output of differentiator 2, 'diff2', of FIG. 5, which is stored in 'r9' of FIG. 7, to be added to the value in register 'I1' of FIG. 5, which is stored in 'r10' of FIG. 7.

At sequence 0 clock 1, register 'r10' of FIG. 7 is clocked storing a new Interp. 3 output value. The FIG. 7 controls s2 and m1_select=1, while $m_2$ select=0. This calculates the term $D[\frac{1}{2}Z^{-1}+\frac{1}{8}Z-1]$, a portion of Interp. 2 phase A, as per equation (19).

At sequence 0 cycle 2, register 'r3' of FIG. 7 is clocked storing the $\frac{5}{8}DZ^{-1}$ term of equation (19). The control s3 and m1_select=1, while m2_select=0, to allow the $[\frac{1}{4}+\frac{1}{16}]DZ^{-2}$ term to be calculated for phase A of Interp. 2 from equation (19).

At sequence 0, cycle 3, register 'r4' of FIG. 7 is clocked to store the value of the $[\frac{1}{4}+\frac{1}{16}]DZ^{-2}$ term output from 'r3' of FIG. 7. Register 'r3' is clocked to store the value $[\frac{1}{4}+\frac{1}{16}]DZ^{-2}$ output from adder1. The controls s4, s5 and m2_select=1, while m1_select=0, to add the term $\frac{5}{8}DZ^{-1}+[\frac{1}{16}+\frac{1}{4}]DZ^{-2}$ for phase A of equation (19), where the term $\frac{5}{8}DZ^{-1}$ is stored in r4 and $[\frac{1}{16}+\frac{1}{4}]DZ^{-2}$ is stored in r3.

At sequence 0 cycle 4, register 'r3' of FIG. 7 is clocked to store $\frac{5}{8}DZ^{-1}+[\frac{1}{16}+\frac{1}{4}]DZ^{-2}$, the output of adder1 of FIG.

7. Control inputs s6, s7 and m2_select=1, while m1_select=0, to add the output of differentiator 2, 'diff2', of FIG. 5, stored in 'r9' of FIG. 7, to be added to the value in register 'I1' of FIG. 5, which is stored in 'r10' of FIG. 7.

At sequence 0 cycle 5, register 'r10' of FIG. 7 is clocked storing a new Interp. 3 output. The control inputs s1, s5 and m1_select, while m2_select=1, to add the 1/16D term of equation (19) to the value in 'r3'. This completes the calculation of Interp. 2 phase A, as per equation (19).

At sequence 0 cycle 6, register 'r11' of FIG. 7 is clocked, storing the output of adder1, Interp. 2 phase A. The control inputs s8, s9 and m2_select=1, while m1_select=0 to add the Interp. 2 output in 'r11' to the negative of the value in register 'd2' of FIG. 5, stored in register 'r6' of FIG. 7. The 'TC' block 106 on the output of 'r6' of FIG. 7 performs the two's complement function using a known method.

At sequence 0 cycle 7, register 'r3' of FIG. 7 is clocked, to store the output of differentiator 1, 'diff1', of Interp. 3 of FIG. 5. The FIG. 7 control inputs s5, s10 and m2_select=1, while m1_select=0 to add the output of differentiator 1, 'diff1', and the value in register 'd3' of FIG. 5, which are stored in registers 'r3' and 'r7', respectively, of FIG. 7.

At sequence 1 cycle 0, register 'r9' of FIG. 7 is clocked to store a new output of differentiator 2, 'diff2', of FIG. 5. Control inputs of FIG. 7, s6, s7 and m2_select=1, while m1_select=0, to add the output of differentiator 2, 'diff2', of FIG. 5, stored in 'r9' of FIG. 7, to be added to the value in register 'I1' of FIG. 5, which is stored in 'r10' of FIG. 7.

At sequence 1 cycle 2, register 'r10' of FIG. 7 is clocked, storing a new Interp. 3 output.

During the remainder of each sequence 1-7, in cycles 0 and 4, only the integrator 1 of FIG. 5 is calculated. This is performed by FIG. 7 control inputs s6, s7 and m2_select=1, to add the output of differentiator 2, 'diff2', of FIG. 5, which is stored in 'r9' of FIG. 7, to be added to the value in register 'I1' of FIG. 5, which is stored in 'r10' of FIG. 7. In cycles 1 and 5 of each sequence 1-7, register 'r10' of FIG. 7 is clocked to store the new Interp. 3 output.

After sequence 7 cycle 7, the sequence counter and cycle counter roll over to sequence 8 cycle 0. During this clock cycle, on every sequence, FIG. 7 control inputs s6, s7 and m2_select=1, while m1_select=0. This causes the output of differentiator 2, 'diff2', of FIG. 5, which is stored in 'r9' of FIG. 7, to be added to the value in register 'I1' of FIG. 5, which is stored in 'r10' of FIG. 7.

At sequence 8 clock 1, register 'r10' of FIG. 7 is clocked, storing a new Interp. 3 output value.

At sequence 8 cycle 2, the FIG. 7 control inputs s1 and m1_select=1, while m2_select=0, to allow the term [¼+1/16]D of equation (20) to be calculated for phase B of Interp. 2.

At sequence 8, cycle 3, register 'r3' of FIG. 7 is clocked, to store the value of the ¼+1/16]D term which is output from adder1 of FIG. 7. The FIG. 7 controls s4, s5 and m2_select= 1, while m1_select=0, to add the term ⅝DZ⁻¹+[1/16+¼]D of equation (20) for phase B, where the term ⅝DZ⁻¹ is stored in r4 of FIG. 7 and the term [1/16+¼] D is stored in r3 of FIG. 7.

At sequence 8 cycle 4, register 'r3' of FIG. 7 is clocked to store the term ⅝DZ⁻¹+[1/16+¼]D from equation (20), which is the output of adder1 of FIG. 7. Control inputs s6, s7 and m2_select=1, while m1_select=0, to add the output of differentiator 2, 'diff2', of FIG. 5, stored in 'r9' of FIG. 7, to be added to the value in register 'I1' of FIG. 5, which is stored in 'r10' of FIG. 7.

At sequence 8 cycle 5, register 'r10' of FIG. 7 is clocked, storing a new Interp. 3 output. The FIG. 7 control inputs s3, s5 and m1_select=1, while m2_select=1, to add the term 1/16DZ⁻² of equation (20) to the value in 'r3' of FIG. 7. This completes the calculation of Interp. 2 phase B.

At sequence 8 cycle 6, register 'r11' of FIG. 7 is clocked, storing the output of adder1, Interp. 2 phase B. The control inputs s8, s9 and m2_select=1, to add the Interp. 2 output in 'r11' of FIG. 7 to the negative of the value in register 'd2' of FIG. 5, stored in register 'r6' of FIG. 7. The 'TC' block 106 on the output of 'r6' of FIG. 7 performs the two's complement function.

At sequence 8 cycle 7, register 'r3' of FIG. 7 is clocked, to store the output of differentiator 1, 'diff1', of Interp. 3 of FIG. 5. The FIG. 7 control inputs s5, s10 and m2_select=1, to add the output of differentiator 1, 'diff1', and the register 'd3' of FIG. 5, which are stored in registers 'r3' and 'r7' of FIG. 7, respectively.

At sequence 9 cycle 0, register 'r9' of FIG. 7 is clocked to store a new output of differentiator 2, 'diff2' of FIG. 5. Registers 'r5', 'r6' and 'r7' of FIG. 7 are clocked to update the values in registers 'd1', 'd2', 'd3' of FIG. 5 at the 4 Fs rate. Control inputs of FIG. 7, s6, s7 and m2_select=1, while m1_select=0, to add the output of differentiator 2, 'diff2' of FIG. 5, which is stored in 'r9' of FIG. 7, to be added to the value in register 'I1' of FIG. 5 which is stored in 'r10' of FIG. 7.

At sequence 1 cycle 2, register 'r10' of FIG. 7 is clocked, storing a new Interp. 3 output.

During the remainder of sequence 9-15, in cycles 0 and 4, only the integrator 1 of FIG. 5 is calculated. This is performed by FIG. 7 control inputs s6, s7 and m2_select=1, while m1_select=0, to add the output of differentiator 2, 'diff2' of FIG. 5, which is stored in 'r9' of FIG. 7, to be added to the value in register 'I1' of FIG. 5 which is stored in 'r10' of FIG. 7. In cycles 1 and 5, register 'r10' of FIG. 7 is clocked, to store the new Interp. 3 output.

This entire series of calculations for the interpolation is then repeated.

The present invention, therefore, is well adapted to carry out the objects and attain the ends and advantages mentioned herein as well as other ends and advantages made apparent from the disclosure. While preferred embodiments of the invention have been described for the purpose of disclosure, numerous changes and modifications to those embodiments described herein will be readily apparent to those skilled in the art and are encompassed within the spirit of the invention and the scope of the following claims.

What is claimed is:

1. A method of operating a digital interpolation filter, comprising the steps of:

(a) providing a multi-bit digital input signal;

(b) providing a plurality of digital filter coefficients, each said coefficient comprised of a plurality of bits, n;

(c) providing a coefficient scaling factor for each said filter coefficient;

(d) obtaining a partial product by multiplying a plurality of bits, f, of a selected one of said filter coefficients by said input signal, where f<n;

(e) obtaining an other partial product by multiplying another plurality of bits, s, of said selected one of said filter coefficients by said input signal, where s<n;

(f) obtaining an accumulated partial product by scaling said other partial product by a selected partial product scaling factor and then adding said scaled other partial product to said partial product;

(g) obtaining a product by repeating steps (e)–(f) and adding each successive calculated accumulated partial product to the prior accumulated partial product until all bits of each said selected filter coefficient have been processed;

(h) obtaining an other product by repeating steps (d)–(g) for another one of said digital filter coefficients;

(i) obtaining an accumulated product by scaling said product by a selected coefficient scaling factor and then adding said scaled product to said other product;

(j) obtaining a filter output final product by repeating steps (h)–(i) and adding each successive calculated accumulated product to the prior accumulated product until each of said filter coefficients has been entirely processed; and (k) outputting an interpolated multi-bit output signal, where said output signal represents the value of said filter output final product.

2. A digital interpolation circuit, comprising:

(a) a multi-bit digital input signal;

(b) a coefficient memory device having a plurality of digital filter coefficients stored therein, wherein each said coefficient comprises a plurality of bits;

(c) a coefficient decode circuit having an output, wherein at least a portion of each plurality of bits of each said filter coefficient is provided to said decode circuit;

(d) a multiplication block, wherein said decode circuit output is input to and controls the operation of said multiplication block;

(e) an input signal memory device having a first location and a second location;

(f) a first register;

(g) a second register; and (h) an adder having an output and an input;

wherein said multiplication block has an input which is connected to said coefficient decode circuit output;

wherein said multi-bit input signal is stored in said input signal memory device;

wherein a first selected value of said input signal is stored in said first location in said input signal memory device and is provided to said first register;

wherein a second selected value of said input signal is stored in said second location in said input signal memory device and is provided to said second register;

wherein the contents of said first register and said second register is provided to said adder input; and wherein said adder output is provided to said multiplication block input.

3. The filter of claim 2, further comprising:

(a) an accumulated partial product storage register having an output and an input, wherein said partial product storage register input is connected to said multiplication block output; and (b) an accumulated product storage register having an output and an input, wherein said accumulated product storage register input is connected to said accumulated partial product storage register output.

4. The filter of claim 3, further comprising a device for selecting between said multi-bit input signal and an output from said accumulated product register, for input to said multiplication block.

5. The filter of claim 3, wherein an output from said multiplication block is input to said accumulated partial product storage register and to said accumulated product storage register.

6. The filter of claim 2, wherein said output from said adder is provided to said multiplication block via a multiplexer device.

7. A multi-stage digital interpolation filter, comprising:

(a) a multi-bit digital input signal;

(b) a plurality of input signal storage devices, wherein at least one of said input signal storage devices stores a delayed version of said input signal, wherein each said storage device has an output;

(c) means for selecting a bit shifted version of any selected one of said stored delayed versions of said input signal;

(d) an adder having a plurality of inputs and an output;

(e) a plurality of data storage devices, each said data storage device having an input and an output, wherein said adder output is connected to an input of at least one of said data storage devices, and at least two of said plurality of data storage devices are connected to each other;

(f) a device for selecting between: 1) an output from one of said selected input signal storage devices, and 2) an output from one of said data storage devices, for input to one of said adder inputs; and (g) a multi-bit digital output signal which is output from one of said data storage devices.

8. The filter of claim 7, wherein said multi-stage digital interpolation filter comprises a plurality of cascaded sinc filters.

9. The filter of claim 8, wherein each of said cascaded sinc filters has an input data rate and an output data rate, wherein said output data rate of each respective said sinc filter is greater than the input data rate for each said respective sinc filter.

* * * * *